INVENTOR.
J. H. KRESS

Jan. 5, 1971   J. H. KRESS   3,552,232
TRANSMISSION CONTROL
Filed Sept. 26, 1966   8 Sheets-Sheet 4

INVENTOR.
J. H. KRESS

INVENTOR.
J. H. KRESS

United States Patent Office

3,552,232
Patented Jan. 5, 1971

3,552,232
TRANSMISSION CONTROL
James Henry Kress, Cedar Falls, Iowa, assignor to Deere & Company, Moline, Ill., a corporation of Delaware
Filed Sept. 26, 1966, Ser. No. 582,120
Int. Cl. F16h *37/00;* B60k *23/02*
U.S. Cl. 74—689
37 Claims

ABSTRACT OF THE DISCLOSURE

A control system for an infinitely variable, multi-range transmission providing an infinitely variable speed within a finite range through a combined variable-diameter pulley-type drive in conjunction with a planetry drive wherein the control system establishes the variable drive and controls the planetry drive connections by selectively coupling the elements of the transmission to provide different speed ranges.

---

This invention relates to control system for an infinitely-variable, multi-range transmission, particularly useful in vehicles such as tractors or the like.

The control system is primarily designed for use with a combined variable-diameter pulley-type drive, which provides infinitely variable speed within a limited range, and a planetary drive, wherein the elements are selectively coupled to different transmission elements to provide different speed ranges, the control system establishing the diameter of the variable diameter sheaves and effecting the different driving connections in the planetary drive.

Such a drive is disclosed in U.S. Pat. 3,251,243, and the control system will be described for use with the transmission shown in said patent, although it is to be understood that the system could also be utilized with other similar transmissions.

As disclosed in said patent, the speed of two elements of a three-element planetary drive is controlled to provide a wide variety of speeds in the third or output element, the input speed of one of the elements being provided by the infinitely-variable drive. The sheave diameters in the infinitely-variable drive are hydraulically controlled, and the shifting in the planetary gear train to establish the different driving connections is also accomplished hydraulically.

The primary object of the present invention is to provide an integrated system for controlling a transmission of the type noted, and further to provide a compact and efficient control system for a vehicle transmission, the system being simply and easily manually controlled by the vehicle operator. Another object is to provide such a system which incorporates a main vehicle clutch.

An important feature of the system resides in the proper sequencing of the sheave ratio change and the range shifting when the operator changes the manual control to provide a smooth and gradual change in the vehicle speed or direction of travel.

The advantages of the sequencing as well as the above and other objects of the invention will become apparent from the following description and accompanying drawings wherein:

Figure 1:
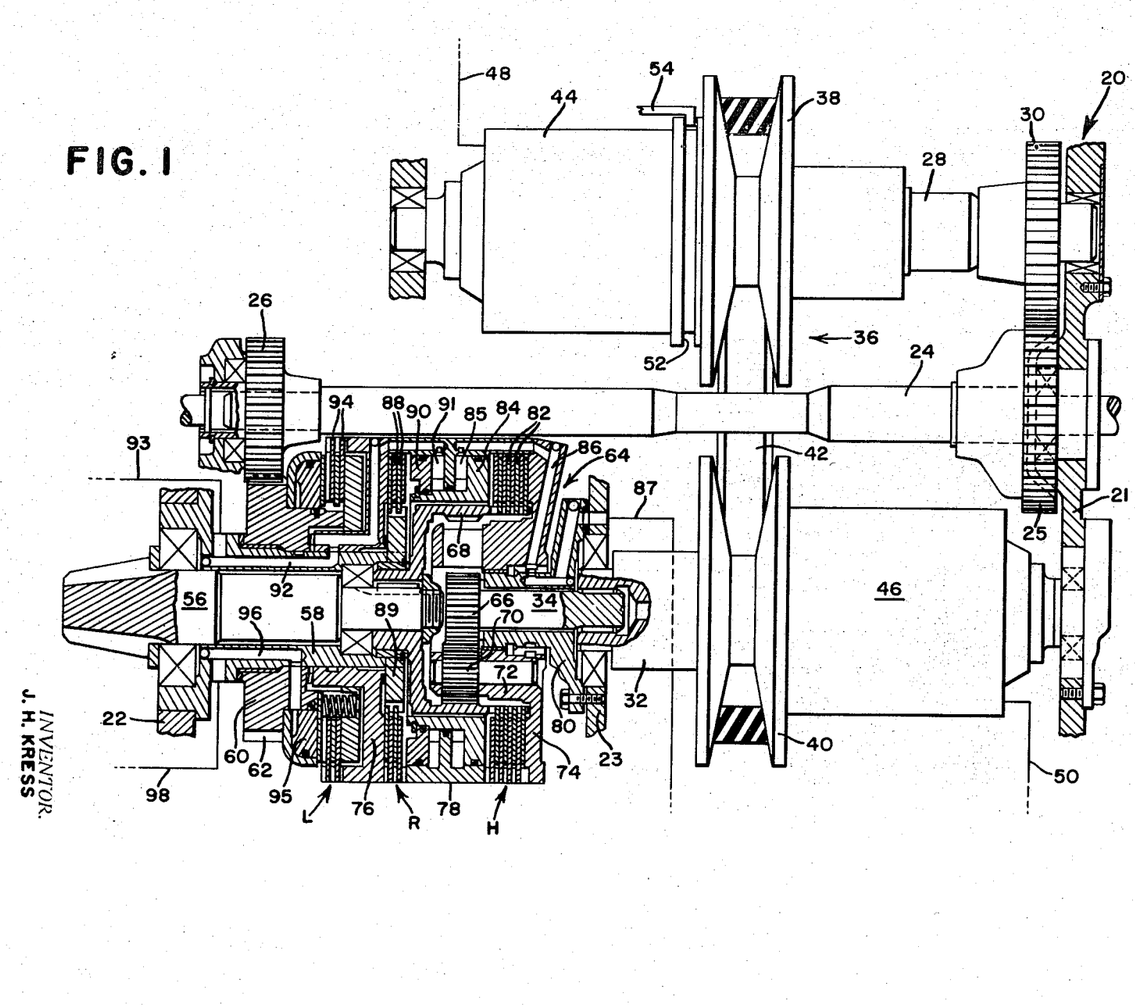
FIG. 1 is a longitudinal, chiefly sectional, view of the transmission with which the control system is associated for purpose of illustration.

The transmission shown in FIG. 1 is carried in a housing 20, only fragmentary portions of which are shown, including an upright forward wall portion 21, an upright rearward wall portion 22, and an intermediate wall portion 23. The transmission is driven by a power source shaft 24, which, in a conventional agricultural tractor, extends rearwardly from and is driven by an internal combustion engine (not shown) governed to operate at a constant speed. The front of the tractor and the engine would be to the right in FIG. 1, the above orientation, and the use of such words as "fore-and-aft," "forwardly," "rearwardly," "upwardly," or "downwardly" being for the purpose of clarity and are not to be construed as limiting the invention. The power source shaft 24 is journaled in the housing 20 and carries forward and rearward spur gears 25 and 26, respectively. A second shaft 28 is also journaled in the housing parallel to the shaft 24 and carries a spur gear 30 at its forward end meshing with the gear 25 to drive the shaft 28 at a constant speed relative to the engine speed. A variable-speed shaft 32 is journaled at its forward end in the housing portion 21 and at its rearward end in the housing portion 23, parallel to the shaft 24 and includes a rearwardly extending shaft portion 34. The variable-speed shaft 32 is driven at variable speeds relative to the shafts 24 and 28 by a variable speed drive means 36, including a variable-diameter drive sheave coaxially affixed to the shaft 28, a variable-diameter driven sheave coaxially affixed to the shaft 32 and an endless belt or driving element 42 drivingly trained around the sheaves, the diameter of the sheaves being respectively established by hydraulically-actuated control cylinders 44 and 46 coaxially affixed to movable sheave faces of the drive and driven sheaves 38 and 40 respectively to axially shift the sheave faces in response to fluid pressure changes within the cylinders, the fluid pressure being supplied to the cylinders 44 and 46 through hydraulic lines 48 and 50 respectively. The drive sheave control cylinder 44 has an annular groove 52 around its outer periphery, and a feeler arm 54 rides in the groove 52 to indicate the position of the cylinder 44 and consequently the ratio in the variable-speed drive means 36.

A rearwardly extending output shaft 56 is coaxially journaled within a sleeve-like housing portion 58 extending forwardly from the rearward housing wall 22. A constant-speed input member 60 is coaxially journaled on the sleeve-like housing portion 58 and includes a peripheral spur gear 62, which meshes with the spur gear 26 to drive the input member 60 at a constant speed relative to the engine speed.

Coaxial with the output shaft 56 and the variable-speed shaft 32 is a planetary gear train 64 which includes a sun gear 66 coaxially attached to the variable-speed shaft portion 34, an annular ring gear 68 coaxially splined to the forward end of the output shaft 56, and a plurality of planetary pinions 70 constantly meshing with the sun gear and the ring gear and journaled in a planetary carrier element 72, the planetary carrier 72 including front and rear radial portions 74 and 76 connected by a substantially cylindrical outer wall portion 78, the front and rear portions 74 and 76, the cylindrical wall portion 78, the front and rear portions 74 and 76, the cylindrical wall portion 78, and the periphery of the ring gear 68 defining an annular chamber.

The planetary carrier 72 is selectively coupled to the ring gear 68, to the housing, or to the constant-speed input member 60 to provide high, reverse, and low ranges respectively, the coupling being accomplished by high, reverse, and low range friction clutches identified by the letters "H," "R," and "L" respectively, the high clutch H and the reverse clutch R acting within the chamber defined by the carrier and the ring gear. The high clutch H includes a plurality of annular friction plates 82 alternately splined to the ring gear 68 and the cylindrical wall portion 78 of the carrier, the clutch plates 82 being pressed into engagement by an annular piston 84 axially shiftable in response to fluid pressure in a chamber 85, pressurized through a high-range clutch passage 86 in the carrier and in the housing portion 80, the high-range clutch passage 86 being connected to a high-range clutch inlet line 87. When the high clutch H is engaged, the carrier is connected to the ring gear, locking up the planetary gear train so that a positive driving connection is established between the variable-speed shaft 32 and the output shaft 56, whereby the speed of the output shaft varies directly with the variable-speed shaft 32.

The reverse clutch R includes a plurality of annular friction plates 88 alternately splined to the cylindrical wall portion 78 of the carrier and a ring 89 attached to the sleeve-like housing portion 58, the reverse clutch plates 88 being pressed into engagement against the rear carrier portion 76 by an annular piston 90 in response to fluid pressure in a chamber 91, the fluid pressure being supplied to the chamber 91 via a passage 92 in the carrier and the sleeve-like housing portion 58 and an inlet line 93. Engagement of the reverse clutch R locks the carrier to the housing, so that the ring gear 68, which is affixed to the output shaft 56, is rotated in the opposite direction from the sun gear 66, which is attached to the variable-speed input shaft 32, the reverse output speed also being directly proportional to the speed of the variable-speed shaft 32.

Figure 2:
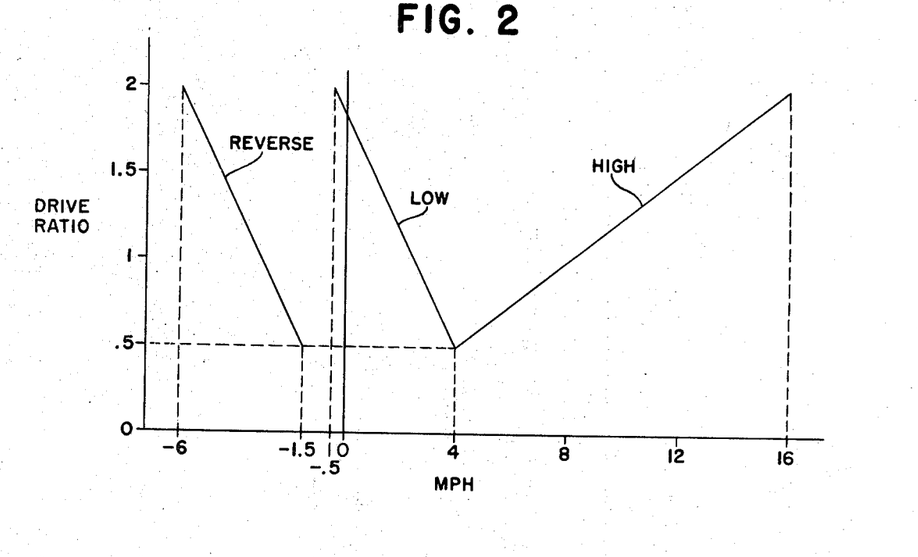
FIG. 2 is a graphic illustration correlating the ground speed and variable-speed drive ratios in the different speed ranges when the transmission and controls are installed on a typical agricultural tractor.

The low-range clutch L includes a plurality of annular friction plates 94 alternately splined to the carrier wall portion 78 and the constant-speed input member 60 and pressed into engagement by an annular piston 95 in response to fluid pressure in a passage 96, which is pressurized through the low-range clutch inlet line 98. When the low clutch is engaged and the high and reverse clutches are disengaged, the planetary carrier 72 is connected to and driven by the constant-speed input member 60, while the planetary sun gear 66 is driven at a variable-speed in the same direction. The speed and direction that the output or ring gear 68 is driven by the dual inputs to the planetary gear train depends on the relative input speeds and the planetary and input gear ratios. FIG. 2 is a graphic illustration of the speed relationships involved when the transmission is installed on a typical agricultural tractor. As graphically illustrated on the vertical scale in FIG. 2, the output to input speed ratio in the variable-speed drive means 36 may be typically variable between .5 to 1 and 2 to 1. When the ratio is at the maximum of 2 to 1, the variable-speed input shaft 32 is driven at twice the speed of the constant-speed input shaft 28, driving the sun gear 66 at its maximum speed relative to the carrier 72. The gear ratios are such that when the sun gear is rotated at its maximum speed and the low clutch L is engaged, the ring or output gear is rotated in the opposite direction from the sun gear, producing a reverse ground speed of approximately .5 mile per hour in the illustrated transmission. Of course, a greater reverse ground speed or even a forward ground speed could be obtained at this point by the proper selection of gear ratios. As the ratio in the variable-speed drive is decreased, the speed of the sun gear is reduced until its effect on the planetary train is balanced by the constant-speed carrier 72, producing a zero output or ring gear speed. Further reduction of the variable-speed ratio results in rotation of the ring gear in the same direction as the sun gear and carrier, producing a forward ground speed, the vehicle having a forward speed of approximately four miles per hour at the minimum .5 to 1 ratio for the particular graphically illustrated installation.

If a higher speed than is available in the low range is desired, the low clutch L is disengaged and the high clutch H is engaged to establish the direct driving connection between the variable-speed shaft 32 and the output shaft 56, whereby the ground speed increases in direct proportion to the increase in the drive ratio of the variable-speed drive, producing a ground speed of 16 miles per hour at the maximum ratio in the particular installation illustrated. The gear ratios are such that speeds of the constant-speed input member 60 and the variable-speed shaft 32 are synchronous at the minimum .5 to 1 drive ratio, so that the minimum high-range ground speed is identical to the maximum low-range ground speed. The shift between high and low range is thus smoothly achieved at the minimum sheave ratio by merely engaging and disengaging the high and low clutches at this ratio.

If a greater reverse speed is desired than can be obtained in the low range, the high and low clutches are disengaged and the reverse clutch R is engaged so the output shaft 56 is positively connected to and driven in the opposite direction from the variable-speed shaft 32, as previously described. Since there is a positive driving connection between the output shaft and the variable-speed shaft in both the high and reverse ranges, the ground speed in both high and reverse ranges is proportional to the ratio in the variable-speed drive. Thus, as is apparent in FIG. 2, a zero ground speed in each of these ranges can be achieved only at a zero drive ratio, which of course is impossible to obtain, the minimum high and reverse speeds being limited by the minimum practical ratio in the variable-speed drive means 36.

Figure 3:
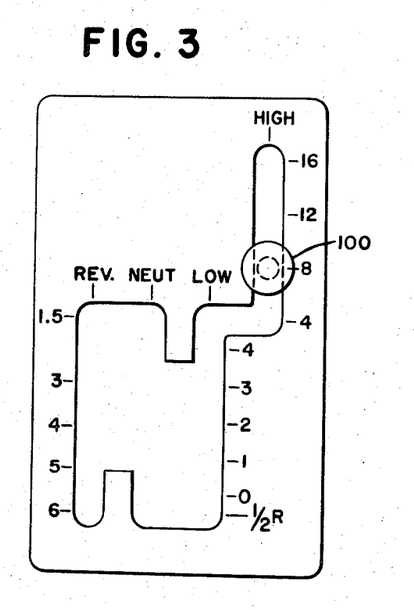
FIG. 3 is a shift quadrant for the single manually-operated control lever by which the operator actuates the control system.
Figures 4, 5:
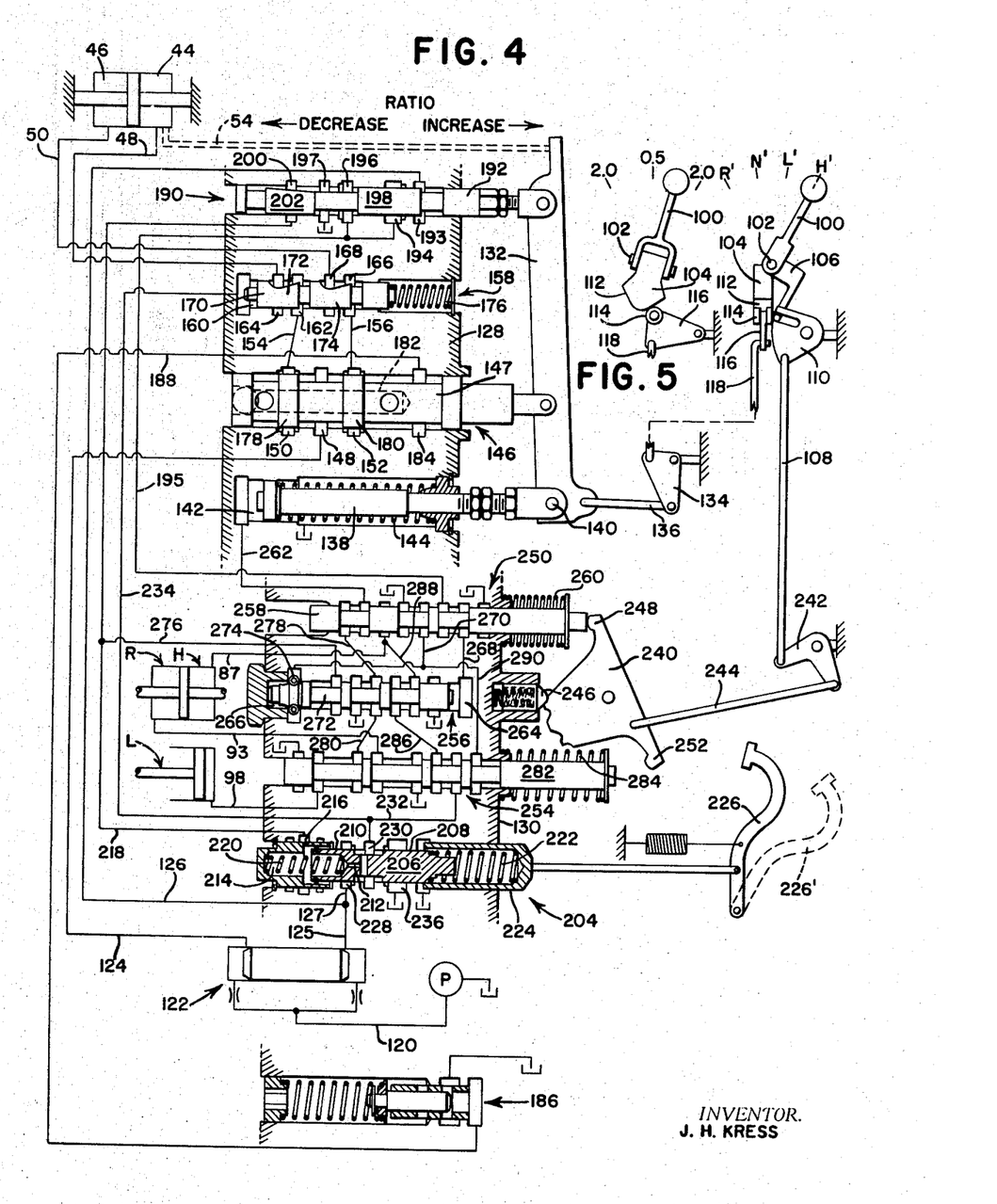
FIG. 4 is a schematic illustration of the transmission control system incorporating the invention and showing the system in high range.
FIG. 5 is a side view showing the fore-and-aft position of the control lever shown in FIG. 4.

The entire transmission is controlled hydraulically by an integrated control system, shown in FIGS. 4-12. The control system in turn is manually controlled by the tractor operator by means of a single control lever 100, the shift quadrant for the control lever 100 being shown in FIG. 3, with the top of the drawing being considered as the direction of machine travel. In general, fore-and-aft movement of the control lever 100 changes the speed of the tractor by changing the ratio in the infinitely-variable drive means 36, as best seen in FIG. 5, which is a side view of the control lever and shows the drive ratios which correspond to the various positions of the lever. Transverse, or sideways, movement of the control lever accomplishes the range shifting of the transmission, as shown in FIGS. 3 and 4, the positions of the control lever which produce the high, low, neutral, and reverse conditions of the transmission being indicated by the letters H', L', N', and R' in FIG. 4. The control lever 100 is swingable from side to side within the shift quadrant about the pivot 102, which in turn is mounted on a pivoted member 104 swingable in a fore-and-aft arc about a transverse pivot. The sideways movement of the control lever 100 rocks the member 106 about the pivot 102, the rocking movement of the member 106 being translated into axial shifting of a rod 108 by a mechanism 110. The bottom of the pivoted member 104 forms a symmetrical cam surface 112, which is normally engaged by a roller type cam follower 114 mounted on a swingable member 116, the fore-and-aft movement of the control lever 100 being translated into axial shifting movement of a rod 118 via the cam surface 112, cam follower 114, and member 116.

The control system hydraulically performs two general functions, namely control of the sheave ratio in the variable-speed drive means 36 and control of the clutches. Fluid pressure for these functions is supplied by an engine-driven pump P having a discharge line 120 and an associated reservoir, the transmission case advantageously serving as a system reservoir. To prevent starving of either control system function during periods of high demand in either function, a flow divider valve 122 of conventional construction is provided in the discharge line 120, the flow divider valve 122 having a discharge line 124 for the sheave ratio control function and a discharge line 125 for the clutch control function, the line 125 having branches 126 and 127.

The valving for the above two functions is mounted in a two-part housing, the first function being generally accomplished by the valves in an upper housing 128, shown in the upper part of the drawings, while a lower housing 130 contains the clutch control valves. The sheave control cylinders 44 and 46 and the high, low, and reverse clutches H, L, and R are all shown schematically in the drawings which show the entire control system.

The basic mechanism of the sheave ratio control is a servo linkage, which includes a servo arm 132, the upper end of which is connected to and moves with the drive sheave control cylinder 44 by means of the feeler arm 54, while the position of the lower end of the arm 132 is established by both the control lever 100 via the rod 118, a bell crank 134, and a second linkage rod 136, and a speed change holding piston 138, which is pivotally connected to the arm 132 at 140 and moves in response to fluid pressure in a cylinder 142 against the bias of a spring 144. The piston 138 and the control lever linkage rod 136 are substantially coaxial and parallel to the direction of movement of the feeler arm 54, so that the opposite ends of the arm 132 move in approximately the same plane.

Fastened to the servo arm 132 intermediate its ends is a sheave control valve 146, including a valve spool 147, an inlet port 148, connected to the pressure source line 124, and drive and driven sheave outlet ports 150 and 152 respectively, the ports 150 and 152 being equally spaced on opposite sides of the inlet port 148 and having associated lines 154 and 156 respectively connected to the drive and driven sheave inlet lines 48 and 50 via a pilot-operated sheave control variable orifice, indicated generally by the numeral 158. The variable orifice 158 includes a cylindrical bore 160 in the housing 128, closed at one end, and having adjacent drive sheave inlet and outlet ports 162 and 164 respectively, connected to the lines 154 and 48, and adjacent driven sheave inlet and outlet ports 166 and 168 respectively connected to the lines 156 and 50. A pilot-positioned valve or piston 170, having land areas 172 and 174 respectively opposite the drive and driven sheave ports, is shiftable in response to changes of pressure in the cylinder 160 against the bias of a spring 176. The lands 172 and 174 have identical orifice areas interconnecting the inlet and outlet ports, the orifice areas providing a variable clearance so that the lands 172 and 174 cause a greater restriction in the fluid flow to the cylinders 44 and 46 as the pressure in the cylinder 160 decreases to cause the piston 170 to shift (to the left in FIG. 4). As will be described herein, the pressure in the cylinder 160 is reduced only when the transmission is in high range so that the flow of the fluid to the cylinders 44 and 46 is restricted to a greater extent in high range.

The sheave control valve spool 147 has a pair of valve lands 178 and 180 with axial dimensions slightly less than and respectively opposite the outlet ports 150 and 152. The reduced diameter portions at opposite ends of the valve spool 147 are interconnected by a passageway 182 in the valve spool, the passageway 182 in turn communicating with a back pressure port 184, which is connected to a sheave back pressure valve 186 by a line 188. When the position of the drive sheave cylinder 44 corresponds to the position of the control lever 100, the sheave control valve is maintained in its null or centered position, wherein the lands 178 and 180 restrict, but do not stop, flow passing to the reservoir via the port 184, the line 188 and the valve 186. When the ratio in the variable-speed drive does not correspond to the position of the control lever, the sheave control valve is shifted from its null position and ports pressure to the particular sheave necessary to move the upper end of the servo arm 132 to a position wherein the arm returns the sheave control valve 146 to its null position. The sheave back pressure valve 186 is basically a conventional relief valve set to port oil to the reservoir above a predetermined pressure. When one sheave cylinder is subjected to the sheave control supply pressure by the valve 146, the other sheave cylinder is connected to the back pressure port, and the sheave back pressure valve 186 maintains sufficient pressure in said sheave cylinder to keep it filled with oil and to provide proper belt tension in the variable-speed drive means 36. There is normally sufficient leakage through the sheave control valve 146 to provide sufficient fluid for the back pressure.

Figure 12:
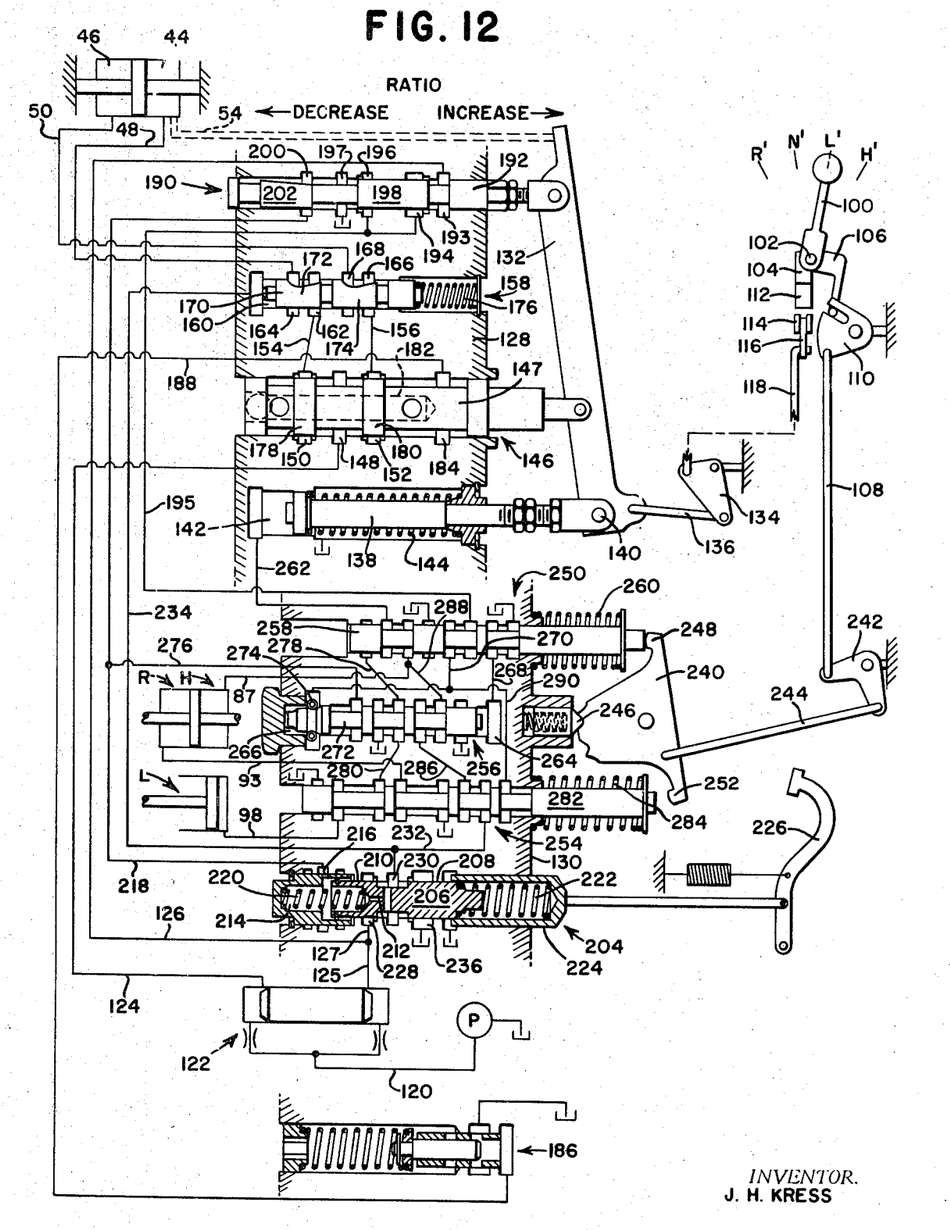
FIG. 12 is similar to FIG. 10, but showing the control system during an intermediate phase of the high-to-low shifting sequence, at the point when the range shift in the planetary gear train begins.

A sheave position sensing valve 190 is also mounted in the upper housing 128 and includes a valve spool 192 attached to and movable with the upper end of the servo arm 132. The sheave position sensing valve 190 provides a trigger signal when the variable-speed drive means 36 reaches its minimum ratio, and includes a first inlet port 193, connected to the pressurized line 126, an outlet port 194, having an outlet line 195, a second port 196, also connected to the line 195, and a sump port 197. A valve land 198 on the spool 192 disconnects the ports 193 and 194 while permitting communication between the ports 196 and 197 at all times except when the variable-speed drive is in its minimum ratio, so that the line 195 is connected to sump except at minimum ratio. When the minimum ratio is achieved, as shown in FIG. 12, the valve land 198 closes the port 196 from the sump port 197 while permitting communication between the ports 193 and 194, pressurizing the line 195. The sheave position sensing valve 190 also serves as a variable orifice, the size of which depends upon the sheave ratio, and includes a second inlet port 200 adjacent the sump port 197, the flow between the ports 197 and 200 being partially restricted by a variable valve land 202, the larger the ratio in the variable-speed drive, the greater the restriction provided by the variable valve land 202.

The hydraulically-actuated high, low, and reverse clutches are controlled by the valves in the lower housing 130. The fluid pressure for the clutch control is provided by a transmission clutch modulating valve 204, which is mounted in the housing 130 and includes a valve spool 206 having valve lands 208 and 210 separated by an annular recess connected to a bucking pressure chamber 214 by an orificed passage 212. The bucking pressure chamber 214 is connected to the inlet port 200 of the sheave position sensing valve 190 via an orifice 216 and a line 218. A relatively light spring 220 in the chamber 214 biases the spool 206 in the same direction as the bucking pressure and is opposed by a clutch valve loading spring 222 at the opposite end of the spool 206, the spring 222 being loaded by a plunger 224 connected to a conventional foot-operated clutch pedal 226, shown in the engaged position in the drawings, the disengaged position of the clutch pedal being indicated by the numeral 226' in FIG. 4. The modulating valve 204 has a pressure inlet port 228 connected to the pressure line 127, an outlet port 230, having an associated outlet line 232 connected to the cylinder 160 of the variable orifice 158 by a pilot line 234, and a sump port 236.

As previously described, the range of the transmission is shifted by transverse motion of the control lever 100, which axially shifts the rod 108, the shifting movement of the rod 108 being transmitted to a pivoted control mechanism member 240 by a bell crank 242 and a linkage rod 244, the member 240 rocking about its axis into four alternate positions corresponding to the four alternate transverse positions of the control lever 100 and being releasably retained in the selected position by a detent mechanism 246. The member 240 includes an upper arm 248, which actuates a range control pilot valve 250, and a lower arm 252, which actuates a low-neutral-reverse control valve 254, the range control pilot valve 250 in turn controlling a pilot-operated shuttle valve 256, the three valves 250, 254, and 256 conjunctively controlling the clutch supply pressure to the high, low, and reverse clutches.

The range control pilot valve 250 has a high position, shown in FIG. 4, which is achieved only when the control lever 100 is in high range, and a low position, which corresponds to the other positions of the control lever. The valve 250 includes a valve spool 258, engageable with the upper arm 248 and biased away from its high-range position by a valve spring 260, and is connected to the cylinder 142 of the speed change holding piston 138 via a line 262, to the high clutch H by the line 87, to the outlet line 195 of the sheave position sensing valve 190, and to high and low pilot chambers 264 and 266 respectively at opposite ends of the pilot-operated shuttle valve 256 by lines 268 and 270 respectively.

Figures 6, 7:
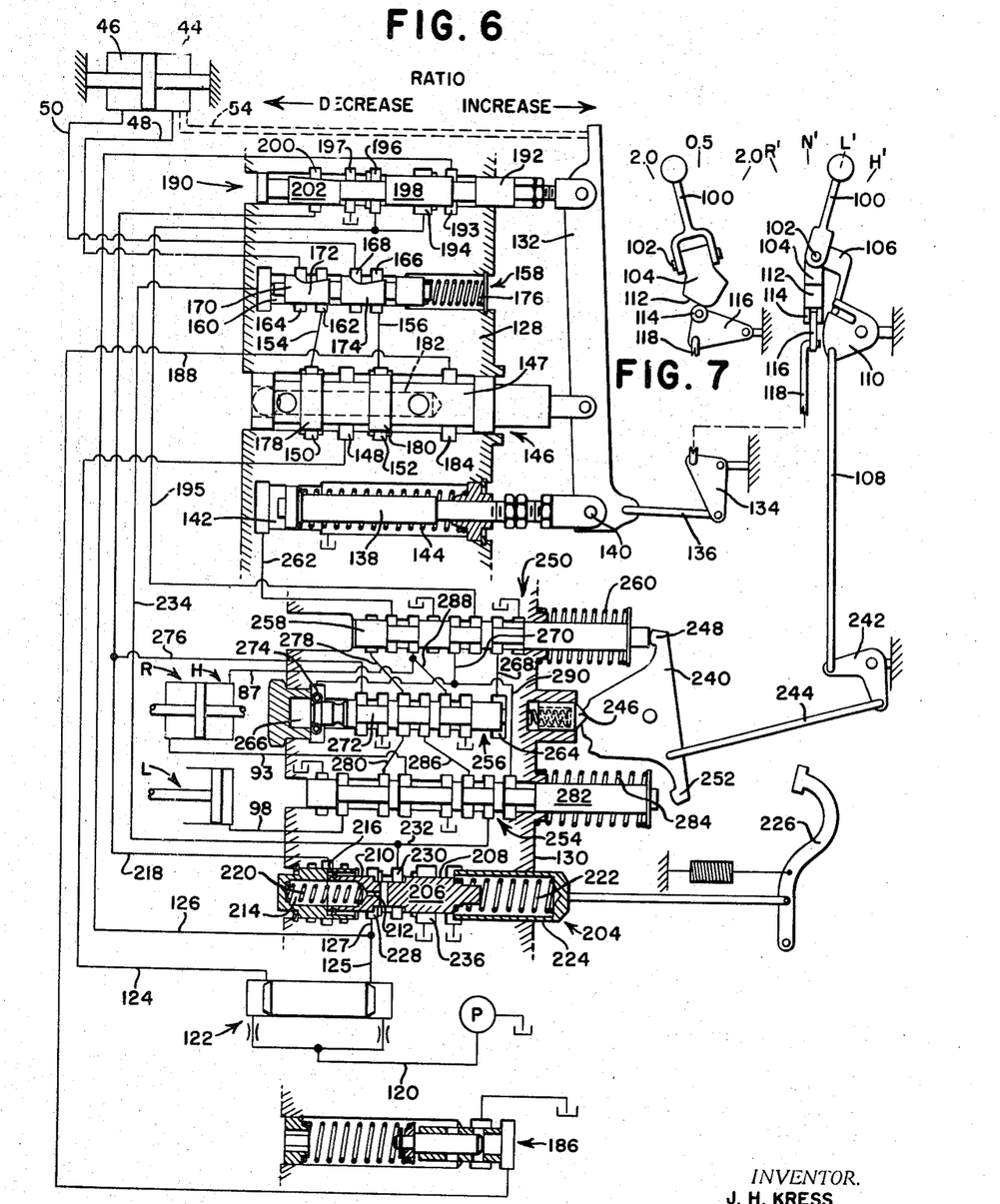
FIG. 6 is a schematic illustration similar to FIG. 4, but showing the system in low range.
FIG. 7 is a side view similar to FIG. 5 showing the fore-and-aft position of the control lever in FIG. 6.

The pilot-operated shuttle valve 256 includes a valve piston or spool 272 shiftable between high and low positions in response to pressurization from the alternate chambers 264 and 266, the piston 272 being releasably maintained in its alternate positions by a detent mechanism 274. In its high position, the shuttle valve 256 directs the clutch pressure to the high clutch H, while in its alternate position, it permits the porting of pressure to one of the other clutches. The shuttle valve 256 is also connected to the line 218 by a line 276, connecting the line 218 and 276 to sump in its low position as shown in FIG. 6. The shuttle valve 256 is also connected to lines 278 and 280 from the valves 250 and 254 respectively, connecting said lines to sump in its high position only.

The control valve 254 includes a valve spool 282, engageable with the lower arm 252 of the member 240 and shiftable into three positions corresponding to low, neutral, and reverse positions of the control lever 100, the spool being biased toward its low position by a valve spring 284. The valve 254 is connected to the low clutch L by the line 98, to the reverse clutch R by the line 93, to the pressure source by the modulating valve outlet line 232, and to the valve 256 by a pressure outlet line 286, the valve 256 connecting the line 286 to the line 278 and 280 in its low position. A line 288 between the valve 256 and the line 87 transmits a fluid pressure to the high clutch H in the high position of the valve, while connecting the clutch to sump in the low position of the valve, and a line 290 connects the valve 254 to the line 270.

In operation, as previously described, the fluid pressure for the hydraulically-operated high, low, and reverse clutches is provided by the transmission clutch modulating valve 204, which is controlled by the conventional foot-operated clutch pedal 226. If the clutch pedal 226 is depressed to the position indicated by the numeral 226' in FIG. 4, the valve spool 206 is shifted to a closed position by the valve spring 220 wherein it completely closes the inlet port 228 while opening the outlet port 230 to the sump port 236, the removal of the pressure from the line 232 causing the disengagement of all of the clutches so that no power is transmitted to the vehicle wheels. If the clutch pedal 226 is released to a partly engaged position, the spring 222 exerts a force on the spool 206, shifting the spool so that the inlet port 228 is unblocked and the sump port 236 is blocked, whereby the pressure in the outlet line builds up. The outlet pressure is transmitted to the bucking pressure chamber 214 through the orificed passageway 212, and when the force exerted by the pressure in the chamber 214 combined with the force of the spring 220 equals the force exerted by the spring 222, the valve spool 206 again meters oil from the port 228. Additional loading of the spring 222 by further release of the clutch pedal 226 will result in a corresponding increase in pressure until the forces acting on the spool 206 are again balanced. Thus the pressure in the outlet line 232 is directly proportional to the position of the clutch pedal, the maximum or normal operating pressure being obtained when the clutch pedal is in its fully engaged position. Since the amount of slippage in the high-low, or reverse clutches depends on the clutch-engaging pressure, the vehicle can be gradually put into motion at any condition of the transmission by gradually releasing the clutch pedal 226 so that the clutch-engaging pressure gradually increases. The controlled slippage of the clutches by controlling the clutch-engaging pressure via the clutch pedal 226 is also advantageous in close maneuvering of the vehicle.

Figure 8:
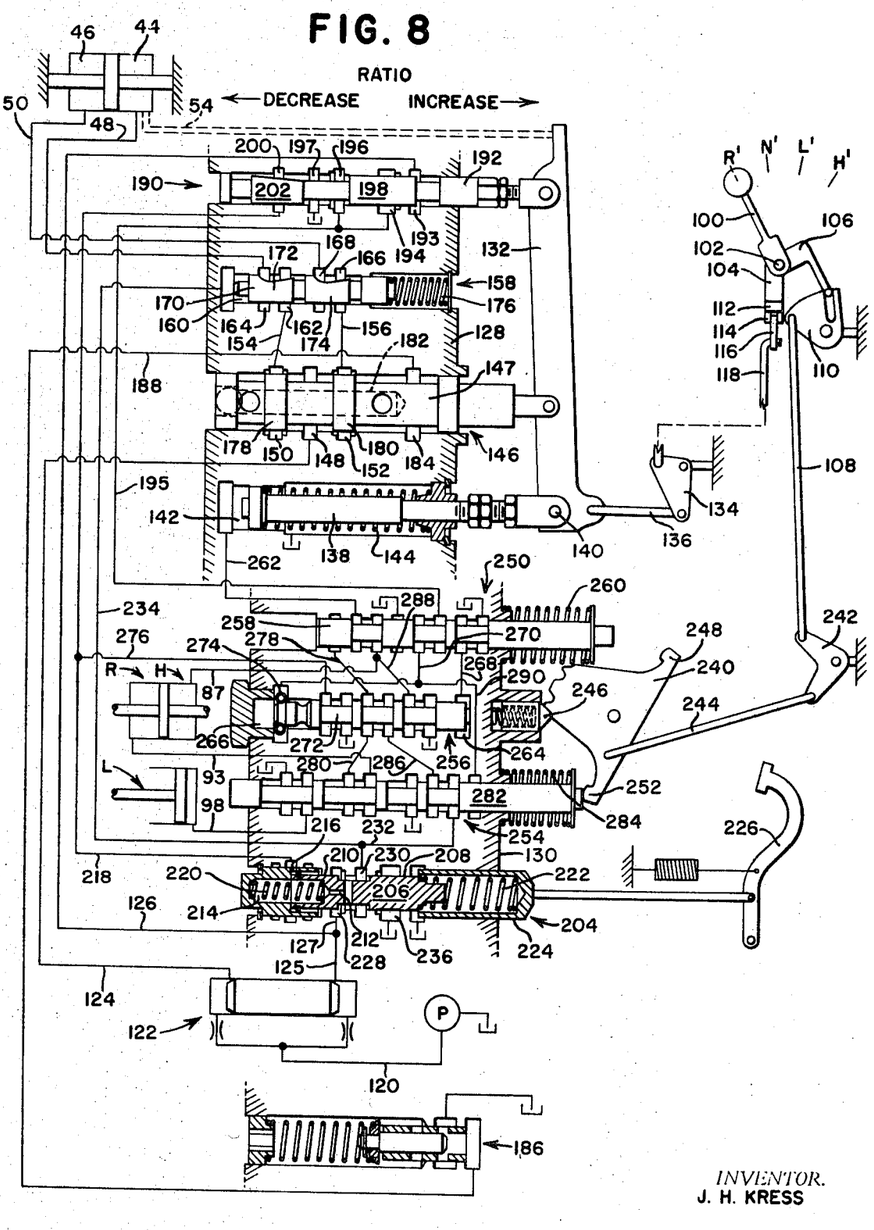
FIG. 8 is a schematic view similar to FIGS. 4 and 6, showing the transmission in reverse.

The transmission clutch modulating valve is also utilized to perform a second desirable function. As shown in FIG. 2, the ground speed of the vehicle is variable between four and 16 miles per hour in the high range. The torque transmitting capacity required of the clutch in high range is approximately four times as great at four miles per hour as it is at 16 miles per hour. Since the high, low, and reverse clutches also act as torque limiting clutches to prevent excess overloading of the drive train, it is desirable to decrease the clutch pressure and consequently the clutch capacity as the variable-speed drive ratio and consequently the ground speed increase. This is accomplished by a controlled bleedoff from the bucking pressure chamber 214 via the orifice 216 and the line 218. In low and reverse ranges, as shown in FIGS. 6 and 8 respectively, the fluid bleeds off from the bucking pressure chamber 214 through the fixed orifice 216 and thence directly to the reservoir via the lines 218, 276 and the valve 256. Thus, the clutch pressure is substantially constant in low and reverse ranges. However, in high range, as shown in FIG. 4, the valve 256 disconnects the line 276 from the reservoir, so that the line 218 is drained only through the variable orifice formed by the variable valve land 202 in the sheave position sensing valve 190. At minmum sheave ratio, as shown in FIG. 12, this variable orifice is substantially open and offers little restriction to the fluid bleeding through it, so that the clutch pressure is substantially the same as in the low and reverse ranges. As the sheave ratio and consequently the tractor speed increase, the valve spool 192 shifts (to the right in FIG. 4) decreasing the size of the orifice and decreasing the flow rate from the bucking pressure chamber 214. The decreased flow rate in the line 218 and the consequent reduced rate of pressure loss in the bucking chamber 214 mean that a lower clutch pressure at the outlet port 230 is necessary to maintain the balance of the modulating valve. Thus the clutch pressure maintained by the modulating valve varies with the variable orifice in the sheave position sensing valve 190, which in turn varies the sheave ratio or vehicle speed.

The variable pressure at the outlet port 230 serves a second function in addition to providing for the variable clutch engaging pressure. As previously described, the ratio in the variable-speed drive means 36 is changed by the sheave control valve 146, which selectively ports fluid pressure to one sheave cylinder while dumping the other sheave cylinder. The rate at which the sheave ratio changes is important, for if it is too slow, the acceleration by the tractor is sluggish, while if the rate of change is too rapid, the resulting excessive accelerations may overload the drive train. The sheave control variable orifice 158 is provided to control the fluid flow to and from the the sheave cylinders 44 and 46 and thereby control the rate of change in the variable-speed drive means 36. However, the optimum rate of sheave ratio change is different at different tractor speeds, since the transmission acts a speed multiplier, and a constant rate of ratio change would either provide too great an accelration at the higher tractor speeds or too slow an acceleration at the lower speeds. In low and reverse range, as shown in FIGS. 6 and 8 respectively, the restriction provided by the variable orifice 158 is constant so that the ratio change is also constant. This is true, because the clutch pressure in the line 232 is maintained at its maximum value by the modulating valve 204 in both the low and reverse ranges, as previously described, and the higher pressure is transmitted to the chamber 160 of the variable orifice 158 via the line 234, the higher pressure on the piston 170 overcoming the spring 176 to shift the piston to the position shown in FIGS. 6 and 8, wherein the variable orifice 158 provides its minimum restriction to the fluid flow. However, in high range the clutch supply pressure in the line 232 decreases as the sheave ratio increases, as previously described, and the spring 176 shifts the piston 170 (to the left in FIG. 4) until the spring force is balanced by the force exerted by the reduced pressure on the piston. As is apparent from FIG. 4, the further the piston shifts to the left, the greater the restriction caused by the variable orifice 158, so that the maximum restriction is provided at maximum speed or sheave ratio when the clutch supply pressure in the chamber 160 is at its minimum. Thus a relatively constant acceleration or deceleration rate is provided throughout the high range.

In FIG. 3, the shift lever 100 is shown in high range at the eight mile-per-hour position. As is apparent from FIG. 2, at this ground speed, the sheave ratio is 1 to 1, and the control lever is shown in approximately this same position in FIGS. 4 and 5. In high range, as shown in FIG. 4, the valve 250 is engaged by the upper arm 248 of the member 240 and maintained in its high-range position wherein it disconnects the high clutch inlet line 87 from the sump. As will be described herein, the line 195 is pressureized only at the minimum sheave ratio shift point, and the valve 250 transmits this pressure to the high-range pilot chamber 264 of the pilot-operated shuttle valve 256 to its high position so that the clutch supply pressure in line 286 is ported to the high clutch H via the shuttle valve 256, the line 288, and the clutch inlet line 87, the line 286 being pressurized by the pressurized line 232 through the control valve 254, which is disengaged from the member 240 in high range. When the valves 250 and 256 are in their high-range position, as shown in FIG. 4, the speed change holding piston cylinder 142 is connected to sump via the line 262, the valve 250, the line 278, and the valve 256, so that the lower end of the servo arm 132 is positioned only by the control level 100, the spring 144 of the holding piston 138 maintaining the cam follower 114 against the control lever cam surface 112. As long as the sheave ratio corresponds to the position of the control lever 100, the upper end of the servo arm 132 is maintained in a position which locates the sheave control valve 146 in its null position as shown. Speed adjustment of the transmission within the high range is accomplished by fore-and-aft movement of the control lever 100, which of course shifts the lower end of the servo arm 132, causing the valve 146 to port pressure to the particular sheave control cylinder 44 or 46 until the sheave ratio corresponds to the control lever position, at which point the upper end of the servo arm is so positioned to place the sheave control valve 146 at its null position.

As shown in the shift quadrant in FIG. 3, the shift from high range to one of the other ranges can only be accomplished at the four-mile per-hour or minimum sheave ratio position of the control lever, and further reduction of ground speed is accomplished in low range by additional downward movement of the control lever. Thus, as is apparent from FIGS. 2 and 5, the ground speed decreases as the sheave ratio increases in low range and the cam surface 112 is such that the lower end of the servo arm 132 is moved to its extreme position (to the right in the drawings) at the shift point. The high point of the cam surface 112 engages the cam follower 114 at the minimum sheave ratio, the cam follower 114 engaging the cam surface 112 on one side of the high point in high range and on the other side in low, neutral, or reverse ranges.

In low range, the control mechanism member 240 is shifted so that the upper arm 248 permits the spring 260 to move the valve 250 to its low-range position, while the valve 254 is not engaged and is is maintained in the same position as in high range by the spring 284, as shown in FIG. 6. In this position, the valve 250 dumps the pilot chamber 264 to the reservoir, while connecting the low-range pilot chamber 266 to the line 195 via the line 270, so that the shuttle valve 256 is shiftable upon pressurization of the line 195 to its low-range position, wherein the high clutch H is connected to the reservoir via the line 288, while the pressurized line 286 is connected to the line 280, which in turn is connected to the low clutch inlet line 98 by the valve 254, the valve 254 still maintaining the reverse clutch R connected to the reservoir. The servo arm 132 again maintains the sheave ratio in a condition which corresponds to the position of the control lever.

Figure 9:
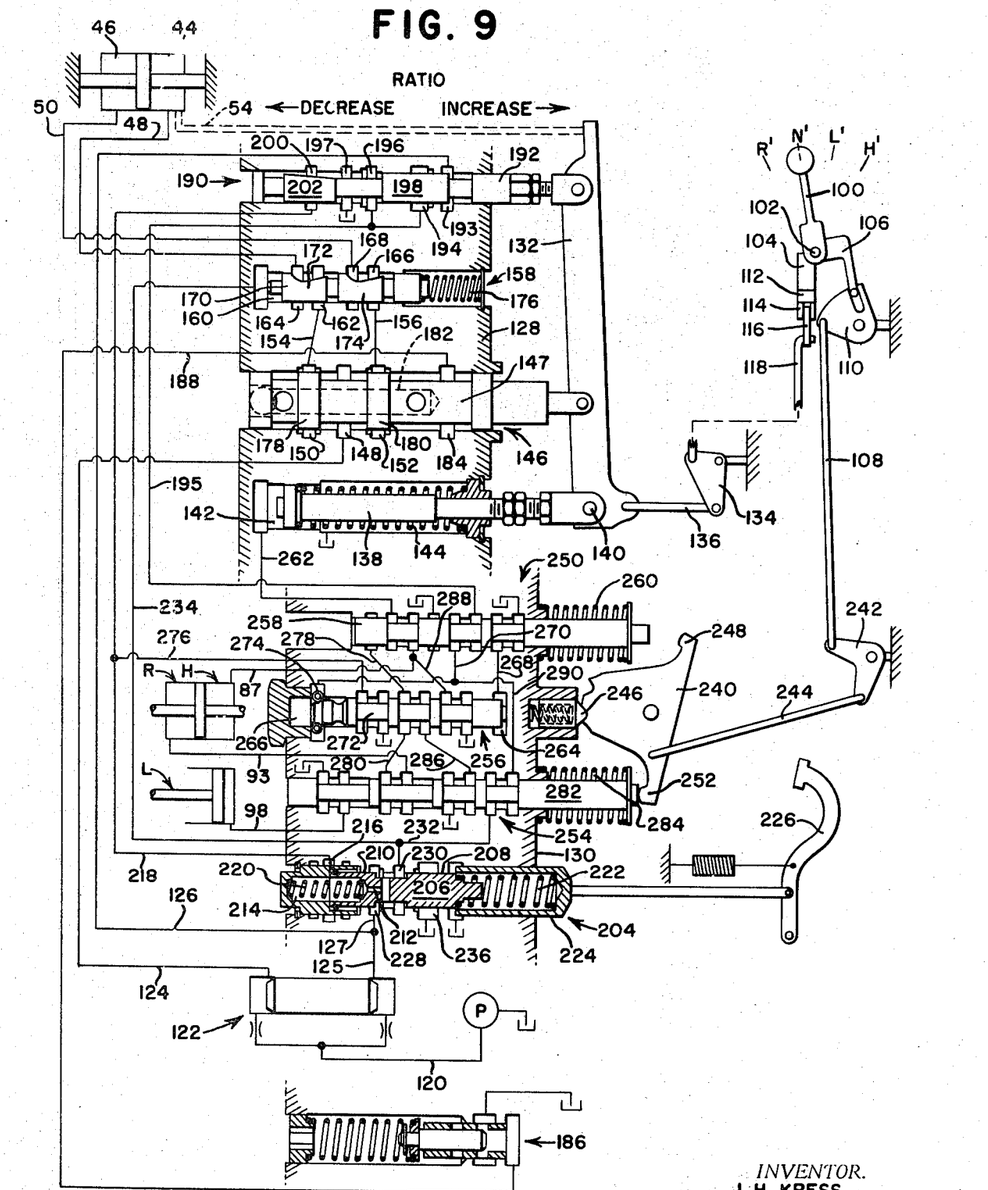
FIG. 9 is a view similar to FIG. 8, but showing the transmission in neutral condition.

Movement of the control lever 100 to the neutral position, as shown in FIG. 9, rocks the control mechanism member 240 about its axis so that it is disengaged from the valve 250 while shifting the valve spool 282 of the control valve 254 to its neutral position, which is intermediate the low and reverse positions. In neutral position, the pressure supply line 232 is connected to the reservoir and connects the reverse clutch R to the line 195, and the valve 190. The shuttle valve 256 maintains the connection of the high clutch H to the reservoir, while the valve 254 connects the low clutch L to the reservoir and connects the reverse clutch R to the line 280, which in turn is connected to the reservoir via the shuttle valve 256, the line 286, and the valve 254.

When the control lever 100 is moved to reverse range, as shown in FIG. 8, the member 240 moves the valve 254 to its reverse position, which is the extreme position to the left in the drawings. In this position, the valve 254 still maintains the low clutch L connected to the reservoir, while connecting the reverse clutch inlet line 93 to the line 280, which in turn is connected to the pressurized line 286 by the shuttle valve 256, the line 286 again being connected to the pressure supply line 232 by the valve 254.

From the above it is apparent that the speed and direction of travel of the vehicle can be simply established by the operator by manipulation of the single control lever 100. However, it is not desirable to change the transmission ration as rapidly as the control lever can be moved, and, as previously described, the rate of ratio change is controlled by the variable orifice 158. The retarded ratio change rate, however, does create problems in the shifting of the transmission ranges. For example, if the operator desired to change from zero speed to 16 miles per hour ground speed, he would simply move the control lever 100 upward, giving it a slight lateral movement at the shift point of four miles per hour, and then continue moving it upward until the lever is set for the desired speed, the change being rapidly achievable. As is apparent from FIG. 2, both the starting speed of zero miles per hour and the terminal speed of 16 miles per hour are achieved at approximately the maximum sheave ratio. Thus, although the sheave ratio would start to decrease as soon as the operator moved the control lever upwardly in low range, a very small ratio change could be achieved in the time that it takes to move the lever from zero to the four-mile-per-hour shift point, and the sheave ratio would still be near maximum when the lever is at the shift point. If the lateral movement of the control lever 100 at this point caused the shifting of the clutches, the low clutch L would disengage and the high clutch H would engage while the sheave ratio is still near its maximum value, and since this condition would provide near maximum speed, the vehicle would suddenly lurch from almost zero ground speed to maximum speed, which of course is obviously undesirable. The reverse of the above sequence would suddenly stop the vehicle, which is similarly undesirable.

Figures 10, 11:
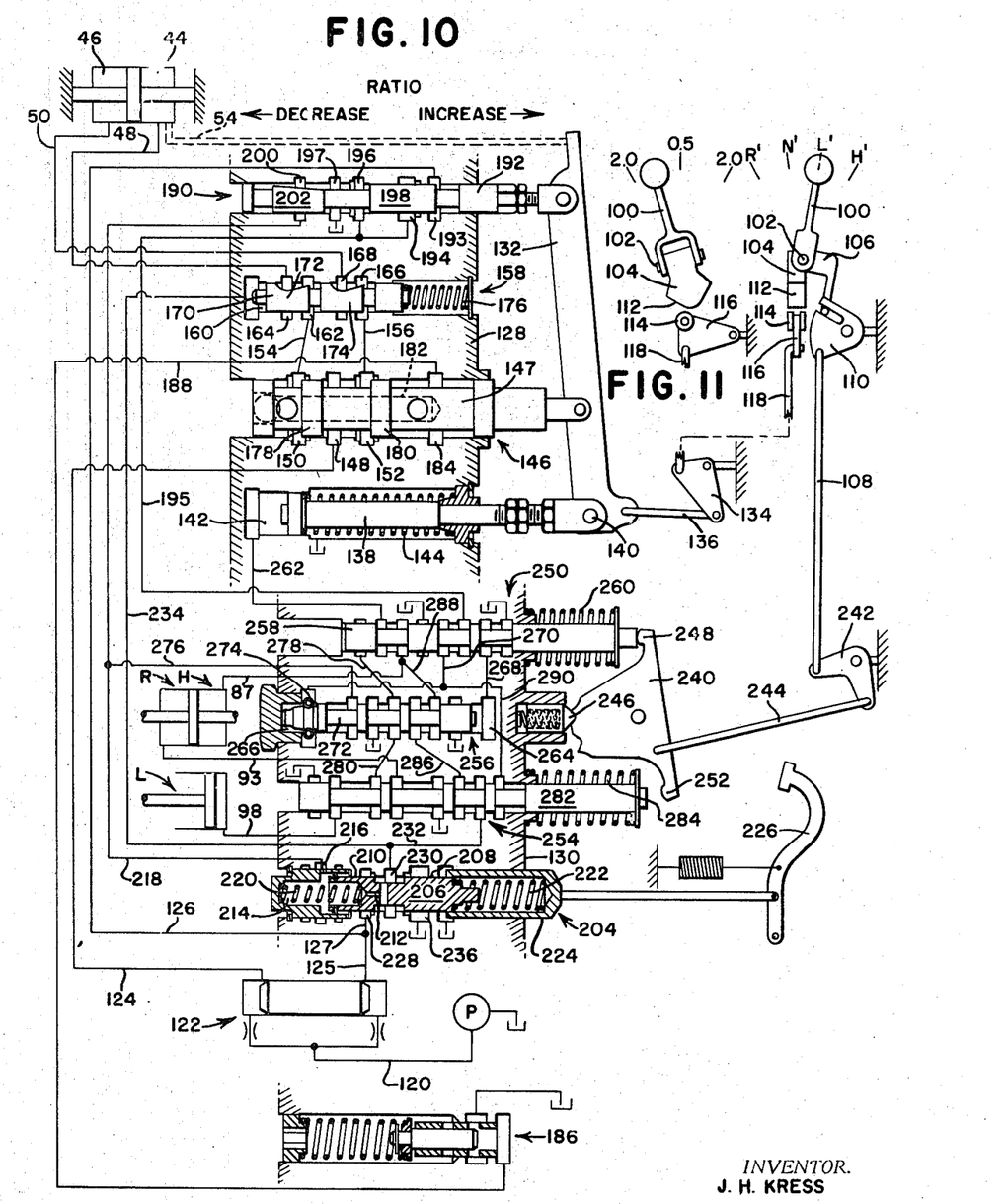
FIG. 10 is similar to the above schematic illustrations of the control system, showing the system during the initial part of the high-to-low shifting sequence.
FIG. 11 is a side view of the control lever in FIG. 10.

An important feature of the invention is the proper sequencing of the shifting, so that the range shift is accomplished at some predetermined sheave ratio rather than at some particular position of the control lever 100. For example, if the control lever is moved from its 1 to 1 ratio in high range, or eight miles per hour forward, as shown in FIG. 4, to the same ratio in low range or approximately three miles per hour forward, as shown in FIG. 6, the following sequence will occur. The initial movement of the control lever to the minimum sheave ratio of .5, or the four-mile-per-hour point on the shift quadrant, will move the cam follower 114 to its lowest position, whereby the lower end of the servo arm 132 is moved to its extreme position to the right, the speed change holding position moving with the arm to its extreme position, as shown in FIG. 10. At this point, the lateral movement of the control lever 100 shifts the valve 250 to its low-range position, as shown in FIG. 10, whereing the valve 250 connects the line 288 to the speed change holding piston inlet line 262. The shuttle valve 256 is only shifted by pressurization of the chamber 266 via the lines 270 and 195, and since the line 195 is not yet pressurized, the shuttle valve 256 retains its high-range position, wherein it connects the pressurized line 286 to the line 288, the pressure therein being transmitted to the speed change holding piston 138 to hold the piston 138 against its stop as shown in FIG. 10. The piston 138 maintains the lower end of the servo arm 132 in this position even though the lever 100 is moved through the minimum ratio position to its selected position. Thus, the cam follower 114 leaves the cam surface 112 as shown in FIG. 11. The control valve 146 ports fluid to the driven sheave control cylinder 46 via the line 156, the variable orifice 158, and the line 50, thereby squeezing the driven sheave 40 to increase its diameter and consequently decrease the sheave or variable-speed drive ratio. The control valve 146 continues to port fluid to decrease the sheave ratio until the sheave ratio reaches its minimum, as shown in FIG. 12, at which time the upper end of the servo arm 132 is shifted to its minimum ratio position (its extreme position to the left in the drawings) by the feeler arm 54, the sheave control valve 146 being returned to its null condition by the servo arm when the minimum ratio is obtained. At this point, the valve land 198 of the sheave position sensing valve 190 blocks the port 196, while permitting connection between the inlet port 193 and the outlet port 194, as shown in FIG. 12, whereby the pressurized line 126 is connected to the line 195, which, in turn, is connected to the low-range inlet line 270 by the range control valve 250. The resulting pressurization of the low-range pilot chamber 266 shifts the shuttle valve piston 272 (to the right in the drawings) to its low-range position, as shown in FIG. 6, causing engagement of the low clutch L and disengagement of the high clutch H as previously described. The shifting of the piston 272 also opens the pressure holding cylinder 142 to the reservoir, releasing the lower end of the servo arm 132, so that the position of the lower end of the arm is again established by the control lever 100. The movement of the servo arm 132 shifts the sheave control valve spool 147, so that fluid is ported to the drive sheave cylinder 44 via the line 154, the variable orifice 158, and the drive sheave hydraulic line 48, until the sheave ratio, as established by the drive sheave cylinder 44, corresponds to the position of the control lever 100.

Thus, the speed change is smoothly and gradually accomplished regardless of the rate at which the control lever 100 is shifted. The sequencing for an increase of speed with a shift from low to high range is, of course, substantially similar to the above-described sequence. Shifts between low and reverse are not sequenced in the present system, although the shift can be smoothly accomplished by means of the clutch pedal 226. A shift from reverse range to high range is sequenced to the extent that low range is an intermediate condition and the low-to-high shift is sequenced as described above. Since neutral is an intermediate condition of a shift from high range to reverse range, there is no sequencing, the pilot-operated shuttle valve 256 being shifted by a triggering pressure through the line 290 when the control lever 100 and consequently the valve spool 282 move through their neutral positions.

The above-described sequencing can be accomplished by various means, such as mechanical or electrical means, in addition to the hydraulic means shown and the invention is not limited to the particular control system for accomplishing the sequencing or other features of the system. Nor is the invention limited to the particular transmission illustrated, for it could be utilized in almost any multi-range infinitely-variable transmission. Moreover, other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a transmission having an infinitely-variable speed drive, providing infinitely variable speed within a limited range, and a change-speed drive associated therewith to provide a plurality of different speed ranges with said variable speed characteristics, including a high and a low range, the combination therewith of a control system for controlling the transmission output speed relative to the input speed comprising: a first control means operatively associated with the infinitely-variable speed drive for establishing the drive ratio therein; a second control means operatively associated with the change-speed drive for shifting the drive into its alternate ranges; a control mechanism shiftable into different positions for preselecting the transmission drive ratio; and means operatively connecting said first and second control means and said control mechanism and responsive to changes in the control mechanism position to actuate the first and second control means to change the transmission drive ratio at a controlled rate until the transmission attains a preselected ratio.

2. The invention defined in claim 1 wherein the connecting means actuates the second control means to automatically shift the transmission between said high and low ranges only when said infinitely-variable drive is at a predetermined ratio.

3. The invention defined in claim 2 wherein said high and low ranges produce a substantially common transmission ratio at said predetermined shift point ratio of the infinitely-variable drive.

4. The invention defined in claim 2 wherein said predetermined shift point ratio is the minimum output-to-input speed ratio of the infinitely-variable speed drive.

5. The invention defined in claim 1 wherein the high and low ranges produce a substantially common transmission ratio at some point within their range and the connecting means actuates the second control means to automatically shift said change-speed drive between the high and low ranges to attain the preselected transmission ratio only at said common transmission ratio.

6. The invention defined in claim 1 and including means operatively associated with the first control means for controlling the rate of change of the ratio in the infinitely-variable drive.

7. The invention defined in claim 6 wherein said means for controlling the rate of ratio change includes means for retarding the rate of change when the transmission is in high range relative to the rate of change in low range.

8. The invention defined in claim 1 wherein the second control means includes high- and low-range fluid pressure actuatable friction clutches selectively engageable to establish high and low transmission ranges respectively, and the control system includes a source of fluid pressure, a valve means operatively connected to the fluid pressure source and the friction clutches for selectively actuating said clutches, and pressure-reduction means responsive to the condition of the second control means for reducing the fluid pressure supplied to the high-range friction clutch to a lesser pressure than the fluid pressure supplied to the low-range clutch.

9. The invention defined in claim 8 wherein the pressure reduction of the fluid pressure supply to the high-range friction clutch increases as the variable-speed drive ratio increases.

10. The invention defined in claim 1 wherein the second control means includes a plurality of fluid pressure actuatable coupling means selectively engageable to establish alternate driving connections in the change-speed drive, and the control system includes a source of fluid pressure, and valve means disposed between and operatively connected to the fluid pressure source and said coupling means for selectively distributing the pressurized fluid to cause engagement or disengagement of the coupling means.

11. A transmission control system for a combined variable-speed and planetary drive, the variable-speed drive including variable-diameter drive and driven sheaves connected by an endless driving element to provide infinitely-variable speed within a limited range, and the planetary drive including an output element, a first input element drivingly connected to the drive sheave, a second input element drivingly connected to the driven sheave, and plurality of planetary gear train elements, and coupling means selectively operative to effect different driving conditions between said elements to establish different transmission ranges, including high and low ranges producing a substantially common output speed at a predetermined ratio of the variable-drive, said control system comprising: a source of fluid pressure; a first hydraulic motor means operatively associated with the variable-diameter sheaves for establishing the variable-speed drive ratio; a second hydraulic motor means operatively associated with the planetary drive coupling means to actuate the coupling means and establish the different transmission ranges; a control mechanism shiftable into different positions for preselecting the transmission range and the variable-speed drive ratio, including a high-range and a low-range position, and control means operatively connected to the fluid pressure source and the first and second hydraulic motor means and responsive to the position of the control mechanism to control the fluid pressure to the hydraulic motor means so that the variable-speed ratio and transmission range correspond to the preselected control mechanism position.

12. The invention defined in claim 11 wherein the control means includes sequencing means operatively connected to the second hydraulic motor means and the variable-speed drive for permitting shifting of the second motor means between its high- and low-range conditions only at said predetermined ratio of the variable-speed drive.

13. The invention defined in claim 12 wherein the control means includes a sheave control valve operatively connected to and disposed between the fluid pressure source and the first hydraulic motor means for distributing the pressurized fluid to the first hydraulic motor means, and a fluid flow restriction means operatively associated with the sheave control valve to control the fluid pressure flow to the first hydraulic motor means and thereby control the rate of ratio change in the variable-speed drive.

14. The invention defined in claim 13 wherein the fluid pressure flow restriction means includes a variable orifice having a first position wherein it provides a predetermined amount of flow restriction and a second position wherein it provides a greater flow restriction, and including means responsive to the condition of the second hydraulic motor means for shifting the orifice into its second position when said second hydraulic motor means is in its high-range condition and into its first position when the second hydraulic motor means is in its low-range condition.

15. The invention defined in claim 11 wherein the control means includes a sheave control valve operatively connected to the fluid pressure source and the first hydraulic motor means for controlling the fluid pressure distribution thereto, and a servo linkage having a first portion connected to and positionable by the control mechanism, a second portion operatively connected to the variable-speed drive so that its position is responsive to the variable-speed drive ratio, and a third portion operatively connected to the sheave control valve to acuate the sheave control valve to port pressurized fluid to the first hydraulic motor means when the position of the second servo linkage portion as established by the variable-drive ratio does not correspond to the position of the first servo linkage portion as established by the control mechanism.

16. The invention defined in claim 15 wherein the control mechanism moves the first servo linkage portion to a position corresponding to said predetermined shift point ratio of the variable-speed drive during shifting movement of the mechanism between high- and low-range positions, and the control means includes sequencing means operatively connected to the second hydraulic motor means for shifting of the transmission ranges only at said predetermined shift point ratio of the variable-speed drive.

17. The invention defined in claim 16 wherein the sequencing means includes a locking means operatively associated with the first portion of the servo linkage to releasably maintain said portion in a position corresponding to the predetermined shift point ratio of the variable-speed drive during shifting of the control mechanism between high- and low-range until the variable-speed drive attains said predetermined shift point ratio.

18. The invention defined in cailm 11 wherein the control mechanism includes a single control lever actuable in one direction to select the variable-speed drive ratio and a second direction to select the transmission range.

19. The invention defined in claim 11 wherein the second hydraulic motor means includes a high-range hydraulic motor actuatable to establish the high-range transmission condition and a low-range hydraulic motor actuatable to establish the low-range transmission condition and the control means includes a range selector means operatively connected to and disposed between the second hydraulic motor means and the fluid pressure source and shiftable between a plurality of positions including high- and low-range positions to control the distribution of pressurized fluid to said motor means.

20. The invention defined in claim 19 wherein the range selector valve means distributes fluid pressure to the high-range motor only in its high-range position and to the low-range motor only in its low-range position, the range selector valve being operatively connected to and actuated by the control mechanism and the variable-speed drive for shifting between its high- and low-range positions to a position that corresponds to the preselected high- or low-range position of the control mechanism only at said predetermined shift point ratio of the variable-speed drive.

21. The invention defined in claim 20 wherein the range selector valve means includes a pilot-operated shuttle valve having a pilot chamber means and shiftable between high-range and low-range positions corresponding to the high- and low-range positions of the range selector valve means in response to selective pressurization of said pilot chamber means, and the control means includes a sheave position sensing valve disposed between the fluid pressure source and said pilot chamber means and operatively connected to and actuated by the variable-speed drive for pressurizing said pilot chamber means for shifting the shuttle value between its alternate positions only at the predetermined shift point ratio of the variable-speed drive.

22. The invention defined in claim 19 wherein the control means includes a clutch pressure modulating valve disposed between the range selector valve means and the fluid pressure source for controlling the distribution of pressurized fluid to the range selector valve and the second hydraulic motor means, the fluid pressure depending on the position of the modulating valve.

23. The invention defined in claim 22 and including a main clutch control mechanism operatively connected to the pressure modulating valve for shifting the position of the modulating valve, the clutch control mechanism being shiftable between a clutch disengage position, wherein the modulating valve disconnects the fluid pressure supply from the range selector valve means, and a clutch engage position, wherein the modulating valve is positioned to distribute a predetermined fluid pressure to the selector valve means.

24. The invention defined in claim 23 wherein the modulating valve includes a bucking pressure chamber and a variable bleed-off orifice operatively associated therewith to decrease the maximum modulating valve output pressure to the selector valve means as the size of the bleed-off orifice decreases, the bleed-off orifice being operatively connected to and actuated by the range selector valve means and the variable-speed drive so that the bleed-off orifice decreases in size to decrease the fluid pressure as the output-to-input ratio in the variable-speed drive increases when the range selector valve means is in its high-range position only.

25. An agricultural tractor comprising: belt-type stepless speed-change means provided in the power transmission path from a motor to driving wheels, a hydraulic system operative to change the speed ratio of said stepless speed-change means, gear means also provided in the power transmission path from the motor to the driving wheels, a hydraulic system operative to shift the gears in said gear means for effecting normal and reverse rotation of the drive wheels, a controller disposed in each of said hydraulic systems, and actuating means having a single lever for actuating both of said controllers.

26. A vehicle transmission and control comprising: a stepless speed-change means including an endless flexible element trained around a pair of variable diameter sheaves; a first hydraulic system operative to change the speed ratio of said stepless speed-change means; a gear means operatively associated with the stepless speed-change means and shiftable to effect normal and reverse rotation of the transmission output; a second hydraulic system operative to shift said gear means; first and second controllers respectively disposed in said first and second hydraulic systems; and actuating means having a single lever for actuating both of said controllers.

27. A vehicle transmission and control comprising: an infinitely-variable-speed drive means providing infinitely-variable speed within a limited range; a first control means operatively associated with the infinitely-variable-speed drive means for controlling the ratio in said drive means; a gear-type change-speed drive means operatively associated with the infinitely-variable-speed drive means to provide a plurality of speed ranges with infinitely-variable-speed characteristics; a second control means operatively associated with the gear-type change-speed drive means for shifting said drive means into its different speed ranges; a control mechanism having a single manually actuable control lever, and means connecting the control mechanism to both control means for actuating both of said control means in response to the position of the control lever.

28. The invention defined in claim 27 wherein the control lever is movable in one plane to actuate the first control means and in a second plane to actuate the second control means.

29. The invention defined in claim 27 wherein the infinitely-variable-speed drive means includes a drive shaft, a variable diameter pulley mounted on the drive shaft, a driven shaft, a variable diameter pulley mounted on the driven shaft, and an endless flexible element drivingly trained around said pulley to drive the driven shaft at an infinitely-variable speed within a limited range.

30. The invention defined in claim 29 wherein the gear-type change-speed drive means includes an output member driven in one direction in one range and in a reverse direction in at least part of a second range.

31. The invention defined in claim 30 wherein at least one of said control means includes a hydraulic motor means and said connecting means includes a hydraulic system having a source of fluid pressure, and control valve means actuatable by said control mechanism to control said motor means.

32. The invention defined in claim 30 wherein the second control means includes a plurality of coupling means operatively associated with the gear-type change-speed drive means and engageable and disengageable to effect different driving connection in said drive means and establish the different speed ranges.

33. The invention defined in claim 32 wherein the second control means including a plurality of hydraulic motor means operatively associated with the coupling means to effect engagement and disengagement of said coupling means, and the connecting means includes a source of fluid pressure, and control valve means connected to said motor means and the source of fluid pressure and actuatable by said control mechanism to actuate said motor means and the coupling means associated therewith.

34. A vehicle transmission and control comprising: an infinitely-variable-speed drive means including a drive shaft, a driven shaft, a pair of variable diameter pulleys respectively mounted on the drive and driven shafts, and and endless flexible element drivingly trained around the pulleys to provide an infinitely-variable drive ratio within a limited range; a first hydraulic control means operatively associated with said drive means to change the pulley diameters and establish the speed ratio in said drive means; a gear-type change-speed drive means operatively associated with the infinitely-variable-speed drive means and shiftable into different speed ranges, at least one of said ranges providing a reverse output in at least a part of the range; a second hydraulic control means including a plurality of hydraulically actuatable coupling means engageable and disengageable to effect different driving connections in the gear-type change-speed drive means and thereby establish the different speed ranges; and manually controllable actuating means for actuating the first and second control means, and including a source of fluid pressure, first and second control valve means operatively connected to the fluid pressure source and the first and second control means respectively, for controlling the fluid pressure supplied thereto, and a manually actuatable control mechanism for actuating said valve means.

35. The invention defined in claim 34 wherein the gear-type change-speed drive means includes an output member, first and second input members respectively connected to and driven by the drive means, a planetary gear train having first, second, and third coaxial elements and planetary pinion means carried by one element and constantly meshing with the other two, and first, second, and third connector means respectively drivingly connecting said first, second, and output members to said first, second, and third planetary elements, at least one of said connector means including one of said coupling means.

36. The invention defined in claim 34 wherein the control mechanism includes a single control lever actuatable in one direction to actuate the first control valve means and in a second direction to actuate the second control valve means.

37. The invention defined in claim 36 wherein the control lever is shiftable into different positions to preselect the range of the change-speed drive means and the ratio in the infinitely-variable drive means, and the actuating means includes means for controlling the rate of change of the infinitely-variable drive means and for shifting the change-speed drive means only a predetermined ratio of the infinitely-variable drive means.

References Cited

UNITED STATES PATENTS

| | | | |
|---|---|---|---|
| 2,439,079 | 4/1948 | Davidson | 74—740 |
| 2,719,442 | 10/1955 | O'Leary | 74—740X |
| 2,933,952 | 4/1960 | Schou | 74—689 |
| 3,091,132 | 5/1963 | Mayfield et al. | 74—722 |
| 3,251,243 | 5/1966 | Kress | 74—689 |
| 3,298,239 | 1/1967 | Migoshi | 74—218 |

ARTHUR T. McKEON, Primary Examiner

U.S. Cl. X.R.

74—681, 861

UNITED STATES PATENT OFFICE
CERTIFICATE OF CORRECTION

Patent No. 3,552,232         Dated 1 January 1971

Inventor(s) James H. Kress

It is certified that error appears in the above-identified patent and that said Letters Patent are hereby corrected as shown below:

Column 13, line 27, change "reducting" to -- reducing -- line 75, change "sequenching" to -- sequencing --.

Column 14, line 57, change "cailm" to -- claim --.

Column 16, line 55, before "endless" change "and" to -- an --.

Column 17, line 4, after "drive" insert -- and driven shafts of the infinitely-variable-speed drive --.

Signed and sealed this 25th day of May 1971.

(SEAL)
Attest:

EDWARD M. FLETCHER, JR.             WILLIAM E. SCHUYLER, JR.
Attesting Officer                    Commissioner of Patents